United States Patent
Folkesson

(10) Patent No.: US 7,287,195 B1
(45) Date of Patent: Oct. 23, 2007

(54) METHOD AND SYSTEM FOR MAINTENANCE OF A VEHICLE

(75) Inventor: Dag Folkesson, Linköping (SE)

(73) Assignee: Saab AB, Linkoping (SE)

( * ) Notice: Subject to any disclaimer, the term of this patent is extended or adjusted under 35 U.S.C. 154(b) by 531 days.

(21) Appl. No.: 10/297,666

(22) PCT Filed: Jun. 7, 2001

(86) PCT No.: PCT/SE01/01327

§ 371 (c)(1),
(2), (4) Date: Dec. 9, 2002

(87) PCT Pub. No.: WO01/97038

PCT Pub. Date: Dec. 20, 2001

(30) Foreign Application Priority Data

Jun. 13, 2000 (SE) .................................. 0002195

(51) Int. Cl.
*G06F 11/00* (2006.01)
(52) U.S. Cl. ............................ 714/44; 701/35
(58) Field of Classification Search .............. 701/35, 701/39; 714/44; 700/26
See application file for complete search history.

(56) References Cited

U.S. PATENT DOCUMENTS

| 4,644,494 | A | * | 2/1987 | Muller ..................... 711/152 |
| 4,698,785 | A | * | 10/1987 | Desmond et al. ............ 714/38 |
| 4,755,997 | A | * | 7/1988 | Takahashi ................... 714/38 |
| 4,890,284 | A | * | 12/1989 | Murphy et al. .............. 714/11 |
| 4,943,919 | A | * | 7/1990 | Aslin et al. ................... 701/3 |
| 5,111,402 | A | * | 5/1992 | Brooks et al. ............... 701/35 |
| 5,184,312 | A | * | 2/1993 | Ellis ......................... 702/121 |
| 5,218,547 | A | * | 6/1993 | Tebbs ......................... 701/14 |
| 5,495,268 | A | * | 2/1996 | Pearson et al. ............. 715/524 |
| 5,541,863 | A | * | 7/1996 | Magor et al. .............. 702/122 |
| 5,764,886 | A |   | 6/1998 | Danielson et al. |
| 5,794,165 | A | * | 8/1998 | Minowa et al. .............. 701/1 |
| 5,872,909 | A | * | 2/1999 | Wilner et al. ............... 714/38 |
| 6,115,656 | A | * | 9/2000 | Sudolsky ..................... 701/35 |
| 6,158,021 | A |   | 12/2000 | Ziegler et al. |
| 6,234,799 | B1 | * | 5/2001 | Lin ............................. 434/30 |
| 6,240,340 | B1 | * | 5/2001 | Minowa et al. .............. 701/1 |

FOREIGN PATENT DOCUMENTS

| DE | 19841260 | 3/2000 |
| JP | 8147198 | 6/1996 |
| JP | 10275013 | 10/1998 |
| WO | 98/28692 | 7/1998 |

* cited by examiner

Primary Examiner—Scott Baderman
Assistant Examiner—Paul F. Contino
(74) Attorney, Agent, or Firm—Bingham McCutchen LLP

(57) ABSTRACT

This invention concerns a system for maintaining equipment (2a, 2b, 2c) housed in a vehicle (1). The equipment has means arranged so as to monitor the operation of the equipment, which monitoring means are connected to a recording unit (3) for recording detected operational deviations in the equipment. The system is further characterized in that, for at least one of the pieces of equipment (2a), the monitoring means (6) are arranged so as to monitor the execution of the software (7) incorporated in the equipment to detect occurrences of fault conditions and/or fault symptoms. The invention also includes a method for software maintenance.

12 Claims, 1 Drawing Sheet

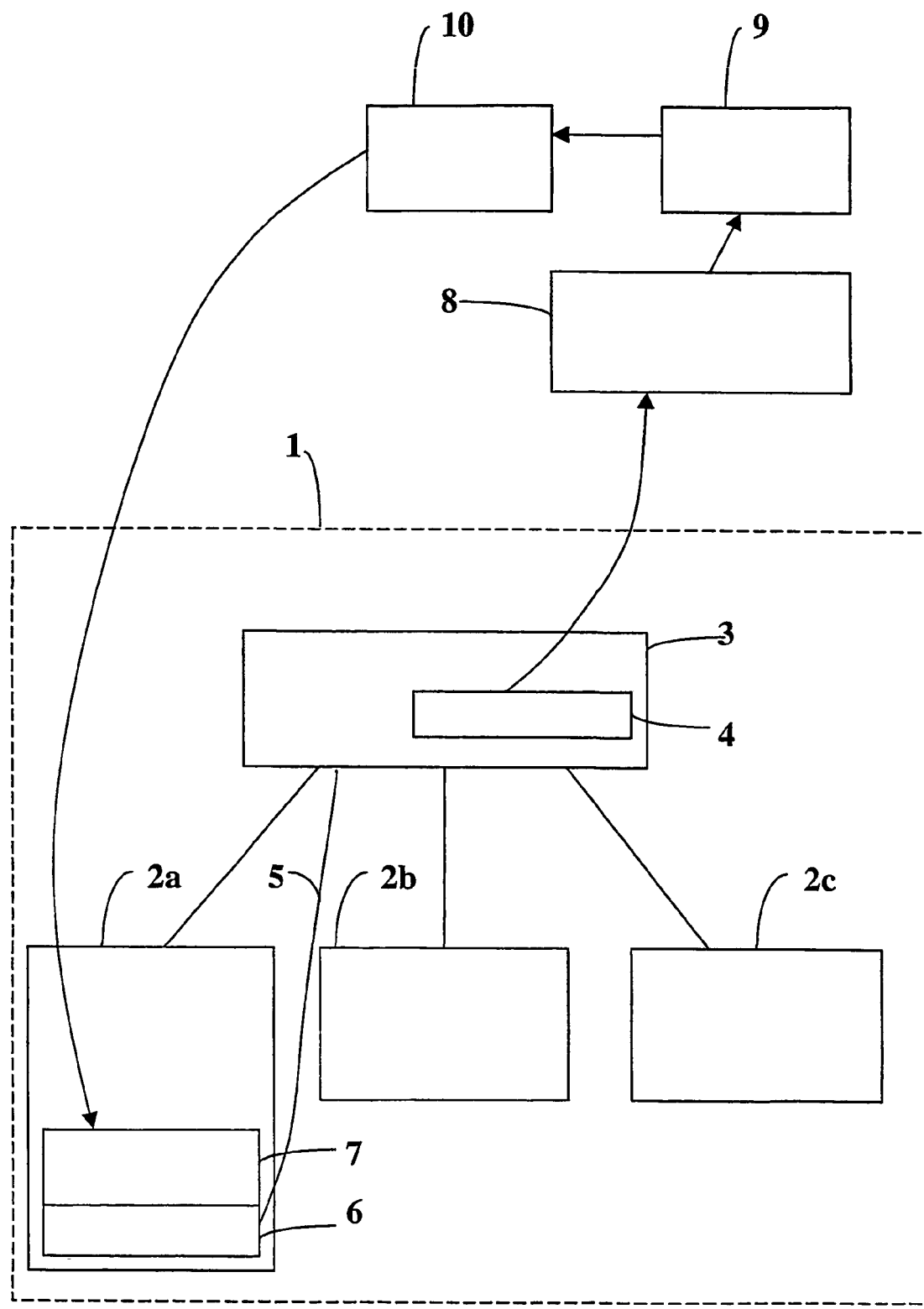

METHOD AND SYSTEM FOR MAINTENANCE OF A VEHICLE

TECHNICAL AREA

This invention concerns a system and a method for maintaining equipment housed in a vehicle, wherein the operation of the equipment is monitored and detected operational deviations in the equipment are recorded.

STATE OF THE ART

The safety requirements associated with aviation are extremely strict, regardless of whether they apply to civil or military aircraft, or to passenger or transport planes. There is a desire to minimize the risk of near-accidents caused by technical failures in aircraft hardware components. As a result, airplanes are often equipped with redundant sets of particularly critical equipment, such as doubled data-bus cabling, redundant processors or alternative and possibly simplified functions that have lower requirements in terms of access to information from, e.g. different transmitters. The aircraft also undergo regular maintenance.

In an attempt to prevent airplanes from taking off if their equipment contains defective components, be they electrical or mechanical, a safety check is conducted prior to takeoff. At that time, test functions that are built into the airplane are automatically run to check that equipment vital to flight is working and, if the plane has redundant sets of such equipment, that they are all working. Failure of a piece of equipment to function properly when it is checked is indicated by means of, e.g. a warning light on the cockpit instrument panel. The takeoff may then be postponed until the equipment has been inspected and the defective components, or the entire faulty piece of equipment, been replaced. The functioning of the equipment is also monitored after takeoff, during flight. Any mechanical or electrical fault that disturbs the function of the equipment is recorded. If, for instance, a fault should occur in one of the doubled data-bus cables in the plane, the data traffic is automatically routed via the other cable, the pilot is informed of the incident by warning lights and a text message on the instrument panel, and the information is stored in a memory unit. After the flight, the recording is taken in hand so that the recorded fault can be localized, identified and, during subsequent maintenance, rectified by replacing the defective components or the entire faulty unit.

DESCRIPTION OF THE INVENTION

According to one embodiment of the invention there is provided a system for maintaining equipment housed in a vehicle. The equipment has means arranged so as to monitor its operation, which means are connected to a recording unit (3) to record detected operational deviations in the equipment. The system is characterized in that monitoring means are arranged for at least one of the pieces of equipment to monitor the execution of software incorporated in the equipment to detect occurrences of fault conditions and/or fault symptoms.

A clarification of the terminology is in order. The program code in a piece of software can contain a number of design defects or software bugs resulting from, e.g. errors made in connection with the design or programming work. Such bugs have thus gone undetected and uncorrected during design testing performed in conjunction with the development of the software in which tests are performed to check, e.g. the functions of the components involved and ensure that variables have reasonable values. A program component starting to deliver unreasonable vales or a variable having an unreasonable value constitutes an example of a fault condition, which is attributable to the design defect. A fault condition may not necessarily be noticed in the functional behavior, but could conceivably be detected by means of special detecting functions. A fault symptom first appears when the unreasonable values are used in the program in such a way that disturbances occur in the program function, or the function breaks down entirely. Certain design defects are thus difficult to detect, since fault conditions that derive from the fault seldom occur, and fault symptoms may be even less common, appearing only in situations that occur very rarely. A number of such hard-to-detect design defects are quite likely to be present in the program code when it is loaded into a piece of aircraft equipment, where they will lie dormant until a situation arises in which one of the defects causes a fault condition. Even more time may pass before this fault condition gives rise to a fault symptom.

The function of the software will be disturbed or will break down entirely in connection with a fault symptom, whereupon the fault symptom will normally be observable by the user/operator/driver.

A software maintenance organization located outside of the vehicle is arranged so as to process the recordings in order to create an updated software version for the equipment that incorporates the software. The software maintenance organization is preferably ground-based, and arranged so as to service a group of vehicles that use similar software.

The monitoring means detect fault conditions as soon as they occur, whereupon the design defects corresponding to the respective fault condition are eliminated through maintenance of the software following transfer of the recordings. Recurrence of the fault conditions in the program, where they pose a risk of giving rise to fault symptoms and consequently near-accidents of greater or lesser severity, is thus prevented in connection with subsequent use of the vehicle. In the long run, the occurrence of design defects in the software incorporated in the equipment is eliminated entirely via such systematic software maintenance. In many cases, it is even possible to rectify design defects before harmful fault symptoms appear. In cases where a plurality of vehicles is equipped with the same software, the software in all the vehicles can be updated appropriately.

The types of software bugs that the monitoring means detect will naturally depend on how the monitoring means are designed. In one embodiment the monitoring means are arranged so as to monitor for compliance with pre-determined criteria that are assumed to apply to the software program template and/or architecture. Examples of fault conditions which are then detectable by the monitoring means and recorded include cases in which the processing time for a given operation exceeds a specified maximum permissible time, a specified maximum permissible number of successive transmission errors is exceeded, the maximum permissible delay at another node in a network is exceeded, or a permissible working range for data or addresses is exceeded. In another embodiment, the monitoring means are arranged so as to detect whether the correlations required for proper function are in effect.

The monitoring means are preferably designed as a part of the software present in the equipment, and are either incorporated directly into the software program code or designed as a stand-alone, bolt-on program code component.

In order to facilitate, or enable, localization and identification of design defects in connection with maintenance, each recording preferably includes fault-localization information and variable values for relevant parameters in effect at the time of the associated fault condition or fault symptom.

In one embodiment the recording means include a memory unit arranged so as to save the recordings.

The vehicle in one embodiment is an aircraft and contains at least one real-time system.

The invention also includes a method as described in claim 10.

BRIEF FIGURE DESCRIPTION

The FIGURE provides a schematic view of an exemplary design of a system for detecting software bugs in a vehicle.

EMBODIMENTS

In the FIGURE, reference number 1 refers to a system containing software 7 forming one or more real-time systems. The system 1 is, e.g. a steel mill, a nuclear power plant, a paper-making machine or a vehicle. In the event that the system is a vehicle, the vehicle is e.g. a ground-borne vehicle such as a car, bus or truck, a water-borne vehicle such as a vessel or a submarine, or an airborne craft such as a helicopter or an airplane. The invention will be described below with reference to an airplane, which can be a military or civil, passenger or transport airplane. The plane contains a number of pieces of equipment 2a, 2b and 2c. The term "equipment" covers systems or combinations of equipment interacting via a communications network. The functions of the equipment 2a, 2b and 2c are monitored, and a problem in the function of one of the pieces of airplane equipment 2a, 2b or 2c will be attributable to, e.g. one or more of its mechanical and/or electrical components breaking down as a result of wear or overloading. Function problems in the form of breakdowns or operational disturbances of any type will be signaled to the pilot via the instrument panel in the cockpit of the airplane, e.g. in the form of warning lights or text messages. If the breakdown or operational disturbances occur during a safety check prior to takeoff, the takeoff can be postponed, the breakdown or disturbances investigated and the faulty components replaced. A new safety check is then conducted, whereupon the plane can take off if no warnings are issued. On the other hand, component problems that arise during flight are rectified during maintenance after the flight. In cases where redundant equipment is present, one of the redundant pieces of equipment is coupled in automatically while the pilot is simultaneously informed that a breakdown has occurred via the instrument panel. If no redundant equipment is present, the pilot can complete the flight using a simplified function without the support of the equipment in question.

The airplane equipment 2a, 2b and 2c is connected to a recording unit 3 containing a mass memory 4. The recording unit 3 has the task of gathering data from the equipment 2a, 2b and 2c that is being affected by disturbances or has broken down, and saving these data in the mass memory 4. After landing, the mass memory 4 is either physically removed from the plane or the data are downloaded into a mobile unit. The contents of the memory are reviewed in order to localize and identify the fault/faults that caused the breakdown or disturbances. During subsequent maintenance, the broken components or the entire faulty piece of equipment is replaced, whereupon the equipment is tested. In an alternative embodiment, the recording unit 3 contains communication equipment so that it can communicate its recordings to a ground-based station during flight, rather than saving them in its mass memory.

The recording unit 3 also has the task of gathering data from the software 7 in the equipment 2a when faults are detected therein in cases where the software is working in real time. The difference between the aforedescribed hardware faults and software bugs lies in that hardware faults occur in components after they have been used for a period of time, due to wear, etc., while the software bugs are hard-to-detect design or programming defects that went undetected during the development and testing of the software and were present in the software when it was installed in the equipment. In the case of these hard-to-detect faults, fault conditions deriving thence occur infrequently, and fault symptoms are even less common, appearing only in situations that arise very rarely. The software bugs that reside in the program code when it is loaded into a piece of a equipment in an airplane thus remain dormant until a situation arises in which the bug gives rise to a fault condition. Even more time may then pass before this fault condition gives rise to a fault symptom which, as noted above, constitutes a situation in which the software function is disturbed or breaks down entirely.

As noted above, the recording unit 3 has the task of gathering information about hardware faults in the equipment 2a, 2b and 2c, along with data concerning software bugs. Gathering data concerning software bugs consists in gathering state and variable values for relevant parameters and variables in connection with both fault conditions and fault symptoms, along with data concerning the procedure or address in the software program code in which the fault condition/fault symptom arose. To enable recording of software bugs, a channel 5 is arranged between the recording unit 3 and the equipment 2a that contains the software 7, via which channel a monitoring component 6 for the software 7 communicates data concerning the detected fault conditions or fault symptoms. Each piece of software 7 thus has a component 6 that is intended to monitor the execution of the software and detect occurrences of fault conditions and fault symptoms so that, when such are detected, the recording unit will record, in its mass memory, information as to which procedure or address was being executed when the fault condition or fault symptom occurred, along with the variable states and variable values prevailing at the time of the fault condition or fault symptom.

The monitoring component 6 of the software 7 is designed to monitor to ensure that pre-determined i.e. specified during the development of the software, criteria are met for the software program template and/or architecture. Examples of fault conditions that are detectable by the monitoring means and communicated to the recording unit 3 via the channel 5 for recording include cases where the processing time for a given operation exceeds a specified maximum permissible time, the maximum permissible delay at another node in a network is exceeded, a permissible working range for data or addresses is exceeded, or a specified maximum permissible number of successive transmission errors is exceeded. In addition, the monitoring means are arranged so as to detect whether the correlations required for proper function are in effect. An example of such a correlation (a so-called "invariant") pertains to the inputting of data to an array with a determinate number of positions. If an index is incremented for each datum fed into array and another index for the number of vacant positions in the array is decremented, then the sum of the two index values must be constant, and must also coincide with the number of positions in the array. The monitoring means are also arranged so as to detect other correlations and limits, e.g. to detect in connection with program operations whether the ingoing operands exhibit unacceptable values for the operation in question.

The ways in which these functions for detecting fault conditions and fault symptoms can be implemented in the monitoring component 6 of the software will be obvious to one skilled in the art. In one example, the monitoring component 6 is incorporated into the software 7 program code, while in another example the monitoring component 6 is a free-standing component that is bolted onto the software 7.

The recordings in the memory 4 that pertain to software bugs are transferred to a special organization 8 for software maintenance. The transfer to the software maintenance organization 8 can occur in a number of different ways. In one example the memory 4 is removed manually from the recording unit 3 after the flight and transported to the maintenance organization 8, where the software recordings are read. In an alternative embodiment in which the memory 4 is unnecessary, the recordings are communicated via, e.g. radio or a cellular communications network to the maintenance organization either during or after the flight. In the software organization 8 the values pertaining to the fault conditions and/or fault symptoms are reviewed in order to localize the underlying program bug or bugs. At least the module or modules of the software source code 9 that are encumbered by bugs are corrected and recompiled. The computer code 10 thus created, which represents a modified variant of the software 7, is then loaded into the equipment 2 or into a corresponding simulator, whereupon its function is tested. All planes equipped with corresponding software 7 are provided with the updated computer code 10. In this way, systematic maintenance is achieved of not only the aircraft hardware, but also of their software. The difference in terms of maintenance work is that complete replacement units are available for installation in the aircraft equipment while, in the case of software bugs, the existing software must be updated by the software maintenance organization 8. From a safety standpoint, it is extremely important that the software used in the aircraft equipment be maintained in order to reduce the number of software bugs so as to obtain, in the long run, software that is completely fault-free, since it is impossible to predict which fault symptoms or damage a software bug will produce in the future. Furthermore, many of these programming errors are of a type where the same bug in the program source code can give rise to entirely different disturbances or near-accidents in two different program versions of the computer code, since the software in each version may be executed according to a separate process.

In the embodiment described herein, the monitoring of the software is integrated with the monitoring of the hardware. However, the invention must not be seen as being limited to this embodiment, but rather as also including pure software monitoring. The embodiment described herein can be used without further modification in the applications cited in the preamble. The transfer of the recordings to the software maintenance organization 8 would then of course be achieved using the most appropriate medium for the application in question.

The invention claimed is:

1. A system for maintaining pieces of equipment housed in a vehicle wherein the pieces of equipment have means arranged so as to monitor the operation thereof, which monitoring means are connected to a recording unit, characterized in that the monitoring means for at least one of the pieces of equipment are arranged so as to monitor the execution of software incorporated in the equipment and detect occurrences of fault conditions and/or fault symptoms and the recording unit recording at least one of state and variable values pertaining to the detected fault condition and/or fault symptom and the address for the portion of code for the software where the fault condition and/or fault symptom occurred when the occurrences of fault conditions and/or fault symptoms are detected and where the address for the portion of code for the software is gathered for recording by the monitoring means.

2. The system according to claim 1, characterized in that it contains a software maintenance organization located outside of the vehicle and arranged so as to process the recording in order to create updated software for the piece of equipment.

3. The system according to claim 1, characterized in that the vehicle is an aircraft.

4. The system according to claim 1, characterized in that the monitoring means are arranged so as to monitor whether pre-determined criteria are being met for the software.

5. The system according to claim 1, characterized in that the monitoring means are arranged so as to monitor whether correlations required for proper function are in effect.

6. The system according claim 1, characterized in that the monitoring means are integrated with their respective software.

7. The system according to claim 1, characterized in that the recording contains localization information and variable values relevant to their associated fault condition and/or fault symptom.

8. The system according to claim 1, characterized in that the recording unit contains a memory unit arranged so as to save the recording.

9. The system according to claim 1, characterized in that the vehicle contains a real-time system.

10. A method for performing maintenance in a vehicle, in which the operation of one or more pieces of equipment housed in the vehicle is monitored, characterized in that, for at least one of the pieces of equipment, the execution of software incorporated in the equipment is monitored and occurrences of fault conditions and/or fault symptoms are detected and at least one of state and variable values pertaining to the detected fault condition and/or fault symptom and the address for the portion of code for the software where the fault condition and/or fault symptom occurred is recorded when the occurrences of fault conditions and/or fault symptoms are detected and where the address for the portion of code for the software is gathered for recording by the monitoring means.

11. The method according to claim 10, characterized in that it contains a software maintenance organization located outside of the vehicle and arranged so as to process the recording in order to create updated software for the piece of equipment.

12. The system according to claim 10, characterized in that the vehicle is an aircraft.

* * * * *